United States Patent Office 2,773,741
Patented Dec. 11, 1956

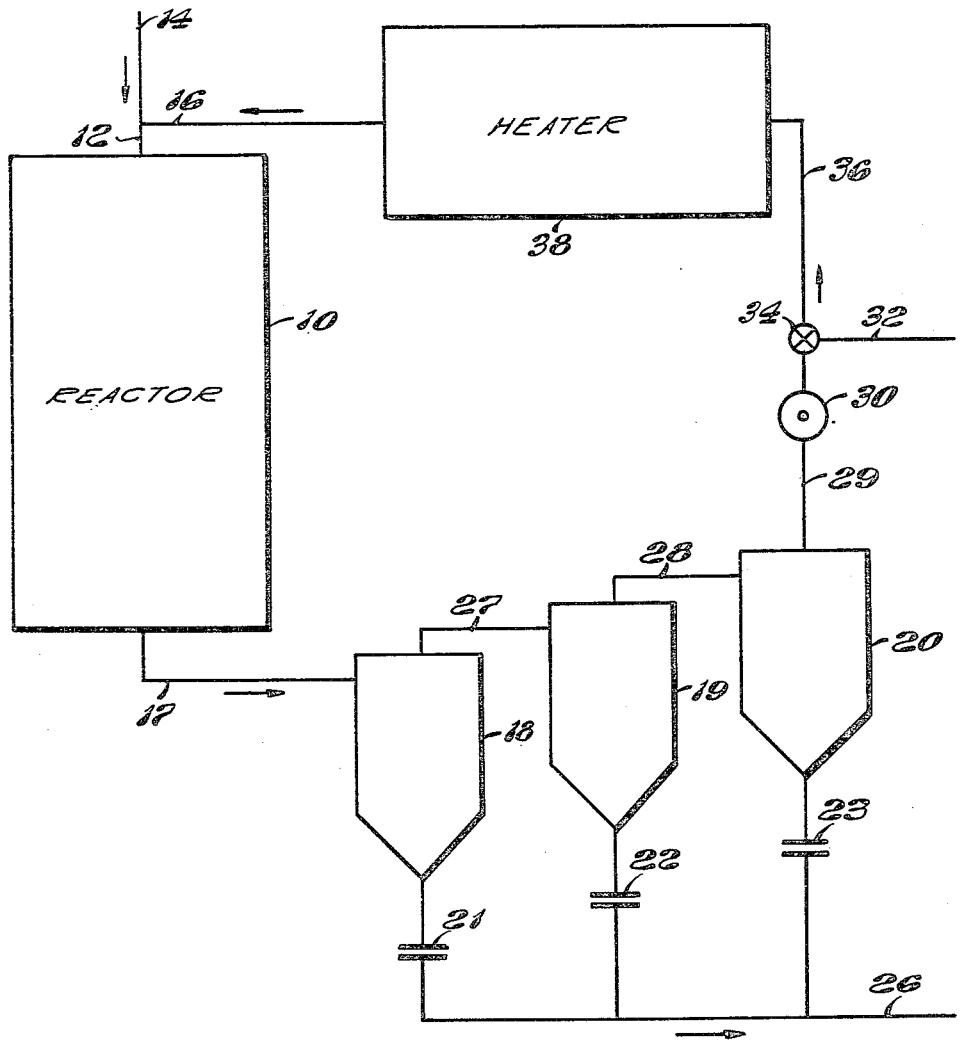

2,773,741

PROCESS FOR THE PRODUCTION OF ALUMINUM OXIDE

Randolph Antonsen, Boston, Mass., assignor to Godfrey L. Cabot, Inc., Boston, Mass., a corporation of Massachusetts Application November 25, 1952, Serial No. 322,526

1 Claim. (Cl. 23—142)

This invention relates to the production of finely-divided aluminum oxide by thermal decomposition of aluminum sulfate and consists in a novel process by which such production may be effected.

As is known in the art, aluminum sulfate will decompose at temperatures above 770° C. to aluminum oxide and oxides of sulfur. In processes heretofore known the aluminum sulfate is placed in a kiln and heated for a sufficient period of time to decompose substantially all of the sulfate. The gases are removed by passing air, steam or other suitable gas continuously over the bed. Obviously, such a process is inefficient being a batch process requiring a roasting time of 1½ to 2 hours to complete the conversion of sulfate to oxide. That so long a time is required is due in part to the poor heat transfer qualities of the solids bed and the slow rate of gas diffusion from the bed.

The novel process of my invention is not so restricted. The reaction time is much shorter and the reaction is much more efficiently carried out. Further, the process of this invention is continuous and provides conditions conducive to a more rapid reaction than does the static bed process.

It is the object of this invention to provide a continuous process for the production of aluminum oxide from aluminum sulfate in which the sulfate is transported through the decomposition reaction zone in hot gases.

Broadly described, the process of this invention consists in the steps of suspending aluminum sulfate, preferably hydrated aluminum sulfate, in solid particulate form in a stream of inert gas, then passing the aluminum sulfate while suspended in the gas through a reaction zone heated to above the decomposition temperature of the aluminum sulfate and separating the solid particles of aluminum oxide from the gases at a temperature above the recombining temperature of the mixture. Inasmuch as the effluent gases when stripped of the aluminum oxide contain valuable sulfur oxides, these are preferably recovered from the exhaust gases by conventional methods, e. g. by fractionation or absorption.

In order to recover the sensible heat from the exhaust gases they may be passed in out of contact heat exchange relation with the inert gas in which is suspended the aluminum sulfate, or a fraction of the hot exhaust gases may be recycled as inert gas.

In the preferred embodiment of this invention the inert gas in which the aluminum sulfate is suspended consists of sulfur oxides that result from the thermal decomposition carried out in the process, and no additional gases are utilized. In this respect, therefore, the process of my invention is self-contained. A portion of the sulfur oxides, after separation of the aluminum oxide, is returned, preferably through a heater, to the influent to the reaction zone and is there supplied with the aluminum sulfate. In this manner several important additional advantages are realized. The sensible heat of the recycled portion of the sulfur oxides is recovered directly, and, since no additional gases are present, the sulfur oxides not recycled are recovered in pure form, thus obviating the necessity of an additional sulfur oxide separation step. Moreover, by pre-heating the gas, the size of the reaction zone may be smaller.

The term "inert gas" is used herein to designate gases or mixtures of gases that are chemically inert to the products encountered in the process, and includes such gases as air, nitrogen, carbon dioxide, sulfur oxides as well as the true inert gases helium, neon and argon.

This invention will best be understood and appreciated from the following detailed description of the preferred example thereof taken in connection with the accompanying drawing which is a flow diagram of the process.

The apparatus employed includes an externally heated reactor 10 having a raw material injector pipe 12 into which are connected aluminum sulfate supply pipe 14 and gas supply pipe 16. A flue 17 leads from the opposite end of reactor 10 into a series of cyclone separators 18, 19 and 20. The bottom of each cyclone connects through a suitable seal such as a steam or hot air seal 21, 22 and 23, into a product recovery pipe 26.

The cyclones 18, 19 and 20 are connected in series by their gas discharge pipes 27 and 28. The gas discharge pipe 29 from the last cyclone 20 discharges through a blower 30 into a recycle line 36 leading to a preheater 38 which in turn discharges into the gas supply line 16. In order that a fraction of the exhaust gases may be removed from the system, a bleed off line 32 connects through a valve 34 into the recycle line 36.

In operation reactor 10, which is preferably an unobstructed, elongated refractory chamber enclosed in a furnace, is heated by external burners to an internal temperature above the decomposition temperature of the aluminum sulfate, that is to say, above 770° C. The sulfate is fed through pipe 14 by any convenient means and after initial start up is picked up by and suspended in hot product gases flowing from heater 38 through pipe 16 into injector pipe 12. In the reactor the decomposition of the aluminum sulfate occurs rapidly and the reaction products are then discharged through flue 17 into the cyclone separators 18, 19 and 20. Flue 17 is insulated to inhibit heat loss, as are the cyclone separators.

In the separators the solid aluminum oxide product is separated from the gases and flows therefrom through the seals 21, 22 and 23. These seals are provided to prevent the sulfur oxides from flowing out with the solid oxide and recombining therewith or adsorbing thereon at temperature below 770° C. The product gases, now relieved of their solids content, leave the cyclones and are divided in valve 34, a portion being diverted to suitable recovery or neutralizing equipment (not shown) and the remainder being recycled through heater 38 to reactor 10 as a carrier for fresh raw material.

Although three cyclone separators are illustrated it will be understood that a lesser or greater number may serve as well, depending upon the design of the cyclones and the volume of flow therethrough. Also other types of separators may be employed provided the aluminum oxide is separated from the gases at a temperature above the decomposition temperature of the aluminum sulfate. While steam or hot air seals have been specifically referred to above other means for removing the solid oxide from the presence of the gases at elevated temperature may be employed.

It will be appreciated that the combination of steps in the process of this invention results in an improved and novel process for producing a valuable aluminum oxide pigment. By reason of preheating the carrier gases a reactor of modest size can be employed and when the gases are preheated to or above the decomposition temperature of the sulfate the decomposition reaction takes place quickly in the reactor to provide a small particle size oxide and almost complete conversion of the sulfate to the oxides of aluminum and sulfur. It will be further noted that the decomposition step is effected in a space or zone uncontaminated by combustion products since the reactor 10 is externally heated and no combustion occurs within it at any time during the operation of the process.

Although this invention has been described as being directed to the decomposition of aluminum sulfate it will be obvious to those skilled in the art that the novel process of this invention may be utilized to produce oxides of metals and metalloids from such of their salts as will decompose to the oxide at elevated temperatures.

Having thus described my invention, I claim and desire to secure by Letters Patent:

A process for producing aluminum oxide and gaseous oxides of sulfur from aluminum sulfate which comprises suspending solid particulate aluminum sulfate in the absence of free moisture in a stream of recycle reaction product gases heated to above the decomposition temperature of the aluminum sulfate, conducting the suspension through an externally heated zone, decomposing the aluminum sulfate therein to gaseous oxides of sulfur and solid particulate aluminum oxide suspended therein, the decomposing step being carried out in a zone free of contamination of combustion products, conducting the gases and suspended aluminum oxide, while maintaining said suspension at a temperature above aluminum sulfate recombination temperature, to a cyclonic separation zone, separating the aluminum oxide from the gases therein, withdrawing a portion of the gases from the system, heating the remaining portion of the gases to above the aluminum sulfate decomposition temperature and recycling said heated gases to said externally heated zone as a carrier and decomposition medium for fresh aluminum sulfate.

References Cited in the file of this patent

UNITED STATES PATENTS

| | | |
|---|---|---|
| 1,132,736 | Schwahn | Mar. 23, 1915 |
| 1,491,237 | Hufford et al. | Apr. 22, 1924 |
| 2,020,505 | Jaeger | Nov. 12, 1935 |
| 2,043,743 | Frary | June 9, 1936 |
| 2,155,119 | Ebner | Apr. 18, 1939 |
| 2,402,471 | Tuwinner et al. | June 18, 1946 |